United States Patent [19]

Rhinehart

[11] 4,014,681
[45] Mar. 29, 1977

[54] VEHICLE RECYCLING PROCESS

[76] Inventor: Paul E. Rhinehart, P.O. Box 184, Mountain Falls Rt., Winchester, Va. 22601

[22] Filed: Mar. 5, 1975

[21] Appl. No.: 555,577

Related U.S. Application Data

[62] Division of Ser. No. 478,377, June 11, 1974, Pat. No. 3,917,239.

[52] U.S. Cl. .................................. 75/12; 75/44 S; 75/65 R
[51] Int. Cl.² .......................................... C21C 5/52
[58] Field of Search ............. 75/44 R, 44 S, 12, 13, 75/65, 63

[56] References Cited

UNITED STATES PATENTS

| 1,863,507 | 6/1932  | Southgate    | 75/37   |
| 1,902,638 | 3/1933  | Gustafson    | 75/44 S |
| 3,412,985 | 11/1968 | Perry et al. | 75/44 S |
| 3,484,231 | 12/1969 | Uzdavines    | 75/65 R |
| 3,812,620 | 5/1974  | Titus et al. | 75/44 S |
| 3,890,141 | 6/1975  | Crane et al. | 75/24   |

Primary Examiner—M. J. Andrews
Attorney, Agent, or Firm—Stewart and Kolasch, Ltd.

[57] ABSTRACT

A vehicle recycling plant comprising a furnace, means for introducing a fuel into said furnace, a cupola disposed in close proximity to said furnace, and communicating therewith so that the hot gases discharged from the furnace are introduced into the cupola, means for conveying scrap vehicles above said furnace and into said cupola, substantially horizontal flue means communicating with both the cupola and the furnace for removing exhaust gases therefrom, a plurality of smelters disposed in said horizontal flue for melting down various components previously disassembled from the vehicles, a plurality of heat exchange means disposed in said horizontal flue for removing heat therefrom and converting it into various forms of energy, an enlarged horizontal flue portion disposed downstream of said heat exchange means, said enlarged flue portion containing a plurality of air vents for mixing ambient air with the flue gas and a scrubbing section for removing particulate material from the flue gas, vacuum pump means for drawing the flue gas through the horizontal stack and exhaust means for discharging the flue gas to the atmosphere.

10 Claims, 2 Drawing Figures

VEHICLE RECYCLING PROCESS

This application is a divisional, of application Ser. No. 478,377, filed on June 11, 1974 now U.S. Pat. No. 3,917,239.

BACKGROUND AND SUMMARY OF THE INVENTION

The present invention is directed to a vehicle recycling plant wherein scrap vehicles are at least partially disassembled, processed, and converted into suitable products. More particularly, the present invention is directed to a vehicle recycling plant for processing, for example, automobile bodies and automobile parts wherein the conversion of the vehicle body and vehicle parts into other products can be accomplished utilizing an inexpensive source of fuel and wherein the residual heat produced during the burning process can be effectively utilized to produce a number of functions. The vehicle processing plant of the present invention makes maximum use of the heat generated during the melting down of the vehicle without measurably contributing to air pollution.

Steel mills require high density high grade scrap for use as charges for steel furnaces in order to produce the requirements of industry. Unfortunately, it is extremely difficult to obtain sufficient quantities of high grade steel scrap because the sources of such scrap are heavily contaminated with materials adversely affecting the physical and chemical characteristics of any steel produced from such scrap.

One of the major sources of such low grade scrap steel is discarded or junked automobile bodies which have been mechanically densified in various ways. It is, for example, common practice to first dismantle the bodies by physically removing the doors, trunk lids and engine hoods, and then cut up the remainder of the body and/or frame to provide relatively large panels or sections which may then be mechanically shredded with mangling devices to produce smaller metal fragments. These fragments are then sometimes processed through a magnetic separating apparatus to roughly sort the basically ferrous from the nonferrous metals. The shredded materials, whether separated or not, may then be compressed by presses or drop hammers into sheets of material which subsequently may be sliced into strips and then baled. Sometimes the shredded material is baled directly, and in some cases the large sections are compressed into a bale without having been first shredded. In any event, all of these methods result in relatively low density, highly contaminated scrap material.

A number of processing plants for processing vehicle bodies into scrap or for converting vehicle bodies into reusable steel or high grade pig ore are well known in the art. However, the present processing plants suffer from a number of deficiencies. For example, the source of fuel utilized in said plants is frequently very expensive and furthermore, effective use is not made of the heat produced in the melting furnaces. In addition, because of the current emphasis being placed upon the limination of air pollution, it is essential that vehicle processing plants provide an effective means for removing the various pollutants from the end of the flue disposed downstream of the furnace.

In some cases, attempts to reduce the contaminants by burning of the discarded automobile bodies has been attempted, but the results have not been satisfactory because of the relatively low temperatures achievable by open dump type burning. Moreover, most communities now prohibit such burning procedures under the air pollution statutes and ordinances. The low grade of scrap which consequently results from the aforedescribed treatments of discarded automobile bodies is not readily salable so that such old and discarded automobile bodies are not in demand for scrap salvage purposes. As a result, more and more communities are finding themselves with large numbers of old abandoned cars accumulating on their streets and roadways, and salvage yards are finding it more and more difficult to dispose of such car bodies when they have been stripped of whatever salable parts were salvageable.

Accordingly, an object of the present invention is to provide an improved vehicle recycling plant wherein an inexpensive source of fuel is utilized for providing the necessary heat for melting down vehicle bodies.

Another object of the present invention is to provide an improved vehicle recycling plant wherein effective and efficient use is made of the heat which is exhausted from the furnace.

A further object of the present invention is to provide a flue which is associated with said furnace which is effective in converting the heat exhausted from the furnace into usable energy while at the same time substantially eliminating particles in the flue so that the exhaust from the recycling plant substantially meets pollution standards and requirements.

Still another object of the present invention is to provide a substantially continuous vehicle recycling plant wherein effective use is made of all of the various types of metals and other materials which can be found in a vehicle which is destined for scrap.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-mentioned disadvantages may be eliminated and a much improved vehicle recycling plant has been developed wherein scrap vehicles are disassembled and processed to produce a variety of metal products and wherein effective use is made of the energy produced during the recycling process. According to the present invention, scrap vehicles are first disassembled and separated into their various component parts. First of all, for example, the rubber tires are removed from the vehicles. These rubber tires are then utilized as an inexpensive source of fuel for the furnace and are particularly effective in that a temperature of about 2400° F. can be achieved in the furnace in the burning of said tires. Of course, the furnace is provided with a plurality of burners which are used to start the combustion in the furnace and in some instances, supplement the heat source provided in the furnace. The furnace can be of any well known design but should be sufficiently large to accommodate about 450–500 tires at one time. Advantageously, the bottom portion of the furnace slopes inwardly so that the steel beads contained in the ash produced by the burning of steel belted tires can be recovered by a container disposed below an aperture provided where the sloping surfaces of the bottom portion of the furnace approach each other. Also, said sloping surfaces are provided with a plurality of apertures through which the ash is removed from the base of the furnace. Advantageously, the sloping surfaces of the base of the furnace can be provided with means for vibrating said surfaces much in the manner of a vibrating hamper. This vibration facilitates the removal of both the ash and the steel beads from the bottom of the furnace.

The scrap vehicle body is further stripped of other components, such as alternators, radiators, generators, starters, voltage regulators, transmissions, carburetors, glass, and the like, which are processed separately in a different portion of the recycling plant of the present invention. Thus, the vehicle bodies, stripped of all of the above components are continuously introduced on a conveyor belt positioned above the top of the furnace for eventual dumping into a cupola where the melting down of the vehicle bodies is completed. The vehicle bodies are conveyed above the furnace so that the radiant heat produced by the furnace can be used to burn up all of the undesirable materials such as wood, upholstery, carpeting, undercoating and the like, which would tend to contaminate the resulting molten metal product. Also the radiant heat begins the vehicle melting down process.

Thus, by the time the vehicle reaches the end of the conveyor system for dumping into the cupola, the melting process has substantially begun. The exhaust provided for the furnace communicates with the cupola and is located in the vicinity where the vehicle body is discharged from the conveyor belt into the cupola so that the heat contained in said exhaust is effectively used to provide a further high temperature environment for melting down the vehicle bodies as they are discharged from the conveyor belt into the cupola. The walls of the furnace and cupola are formed from layers of refractory material, e.g., refractory brick.

As a supplemental source of heat for the cupola, carbon electrodes are suspended from above the cupola and are adapted so that they can be raised or lowered so that they can be placed into close proximity with the surface of the molten steel. Thus, the carbon electrodes can be lowered to a position just above the surface of the steel and are utilized to finish off the melt, that is, to convert the scrap vehicle bodies completely into a liquid form. The carbon electrodes generate off current of about 32,000 KBA and increase the temperature in the cupola to about 3,200° F. Not only is this additional heat effective in finishing off the molten steel in the cupola, but it is also effective in burning the contaminants carried in the flue gas. When a sufficient level of molten steel is achieved, the hot metal is drained from the bottom of the cupola into holding tanks disposed on a conveyor belt. Advantageously, the bottom surface of the cupola container is sloped to facilitate the transfer of the molten steel to the holding tanks. In the holding tanks, the molten steel separates into a lower steel level and an upper slag level. Thus, the conveyor belt can be utilized to transfer the holding tanks to a rolling mill where the steel in said tanks can be drawn off and used to manufacture light structural materials, such as, for example, reinforcing bars, fence posts, and the like. The slag which still remains in the holding tanks can then be dumped. The holding tanks can then be recycled back to the cupola for another load of molten steel. Alternatively, the cupola can be periodically tapped to draw off the molten metal into pig or billet forming molds and the slag is separately tapped and disposed of in any desired manner, such as, for example, as sanitary fill or for aggregate for concrete mixes.

The hot gases which are being drawn from the furnace and from the zone above the molten steel and the cupola are drawn into a substantially horizontal flue which is made of fire brick and is adapted to accomodate a number of devices which make further use of the very hot exhaust gases. For example, the flue is provided with a compartment, e.g., a copper smelter which is completely disposed within and surrounded by the flue gases so that the surfaces of said smelter make maximum use of the heated gases being circulated therearound. For example, the alternators, radiators, generators, starters, voltage regulators and any other copper containing elements found in the vehicle are introduced into the copper smelter. The heat flowing through the flue is thus utilized to melt said elements introduced into the copper smelter. Once the copper elements have been smelted, the molten product can be removed from the bottom portion of the smelter.

Advantageously, the copper smelter can be followed in succession by a zinc smelter, a glass smelter and one or more additional smelters, as desired. These smelters are substantially equivalent to the copper smelter and are utilized for converting scrap products into usable products. For example, the zinc smelter is adapted to receive motors, transmissions and carburetors which are high in zinc content and convert said elements to molten zinc which can be eventually used in a variety of ways. Downstream of the smelters, the flue can be further provided with a number of heating exchange units which are adapted to convert the remaining heated gas traveling through the flue into a number of uses, such as, for example, converting water to steam to run a generator plant or further utilizing said heated gas through the effective use of steam coils to function as a sawdust dryer or a grain dryer.

Downstream of the heat exchange units, the hot flue gas must be cooled down and further cleaned up before it is discharged to the atmosphere. Accordingly, the flue is provided with an enlarged section which fits around the end portion of the smaller flue section thereby defining a zone between said sections for introducing air therebetween.

In other words, because said enlarged section is larger than the existing flue, it fits around said flue leaving an open area between the outer circumference of the flue and the inner circumference of the enlarged section for the introduction of air into the system. Furthermore, the enlarged section is provided with a number of air vents which are angled in the direction of the flow of the heated flue gas. Thus, the air being introduced axially at the beginning of the enlarged section, as well as the air introduced through the air vents causes a complete mixture of the cooler ambient air with the hotter flue exhaust gas thereby substantially reducing the overall temperature of the exhaust gas. Also, because of the turbulence created by the air introduced through the air vents, the exhaust gas in said enlarged section has a substantially uniform temperature throughout. Downstream of the air vents, the enlarged section is further provided with a plurality of spray nozzles which are utilized to remove particulate matter and other pollutants from the exhaust gas. The end of the flue is provided with an exhaust pump which functions to draw the exhaust gas from the furnace and through the flue to eventual discharge to the atmosphere. The exhaust pump also draws the cooler ambient air into the enlarged section of the flue. Also, because of the vacuum produced by the pump, the temperature of the gases produced in the furnace is naturally increased.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
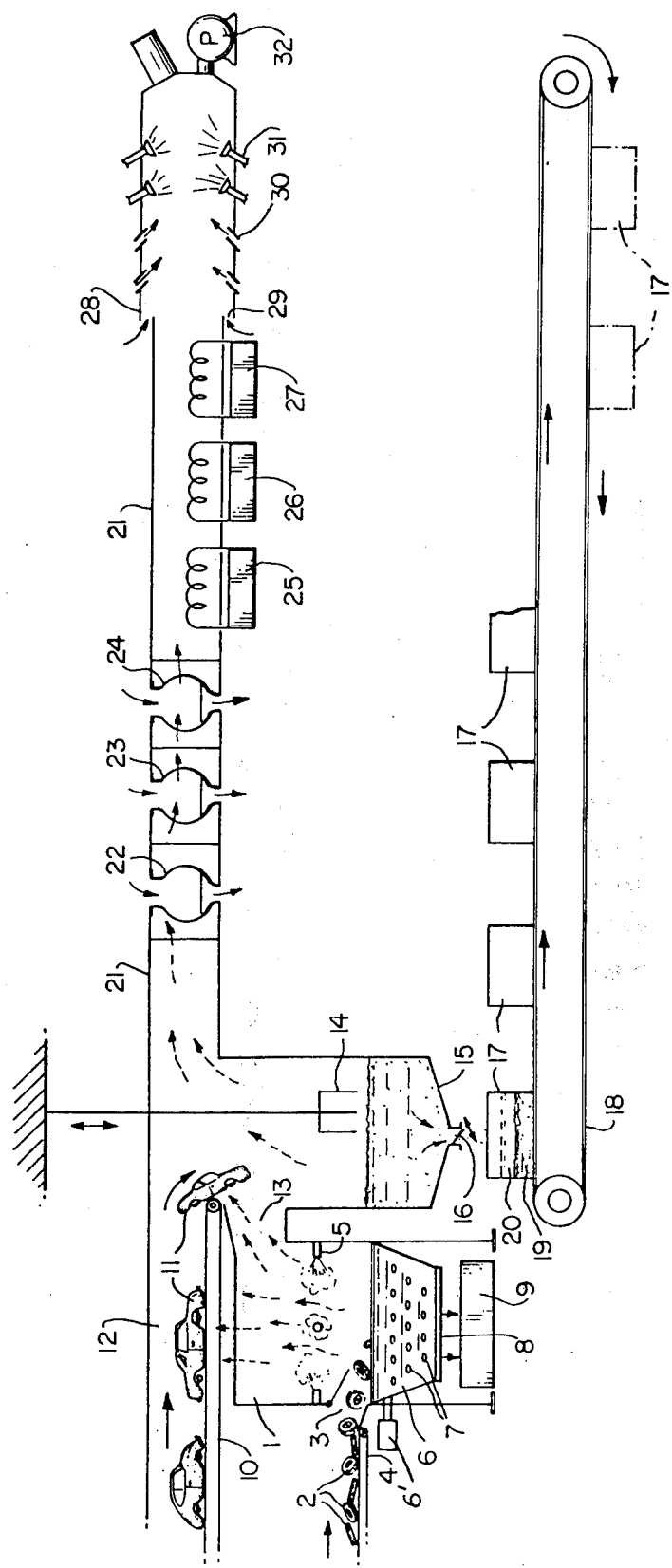
FIG. 1 shows the overall layout of the vehicle recycling plant of the present invention.
Figure 2:
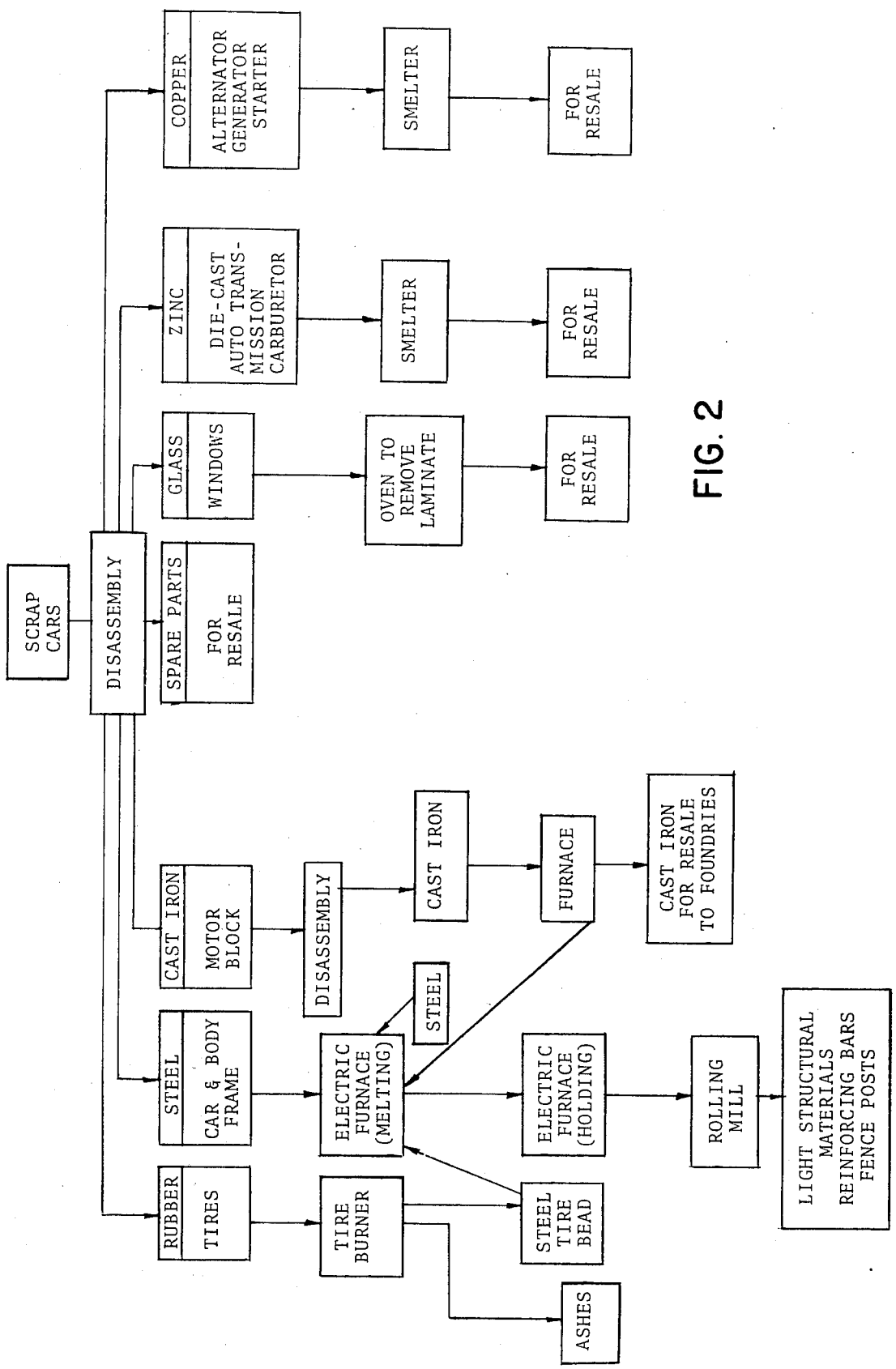
FIG. 2 shows a block diagram which, in a general way, defines a number of the operations utilized in the overall recycling plant of the present invention.

Referring now to the drawings, the vehicle recycling plant of the present invention comprises a furnace 1 into which scrap tires 2 are introduced through opening 3 as a source of fuel therefor. A conveyor belt 4 can be conveniently used to introduce the tires into the furnace. The furnace is provided with a plurality of burners 5 which are not only utilized to initiate the combustion of the tires in the furnace but also function as a supplemental heat source. The fuel utilized to supply the burners can be any conventional type of fuel known in the art. The bottom of the furnace is provided with sloping surfaces 6 containing a plurality of apertures 7 for the removal of ash from the furnace. The sloping surfaces of the bottom of the furnace not only facilitate the removal of the ash from the system but also the removal of steel beads collected from the burning of steel belted tires, said steel beads being removed through a central aperture 8 disposed at the apex of said sloping surfaces. Advantageously, the bottom of the furnace can be provided with a vibrating means (not shown), and as such, would function as a vibrating hamper for enhancing the removal of the ash and the steel beads from the furnace. A container 9 is disposed beneath the aperture 8 for collecting the steel beads recovered from the burned tires. Of course, the steel recovered from the burning of steel belted tires can be subsequently processed and used to produce other elements. As stated above, a conveyor belt is provided at the inlet to the furnace for introducing rubber tires thereto as the course of fuel. Immediately above the furnace and disposed at a slight angle with respect thereto, is located another conveyor system 10 for introducing scrap vehicles 11 into the vehicle recycling plant of the present invention. The conveyor system 10 is disposed in close proximity to the furnace so that the heat radiating from the furnace can be effectively utilized to burn undesirable materials and initiate the melting down process of said scrap vehicles. Advantageously, the conveyor system and the vehicles introduced into the system above the furnace are housed in a duct 12 so that the radiation heat which is conducted through the duct to the scrap vehicles is not lost to the environment. Although FIG. 1 shows the vehicles being conveyed on a conveyor 10 substantially parallel to the top of the furnace, said conveyor can be slightly inclined toward the top of the furnace.

The furnace is provided with a heated gas outlet 13 which communicates with a cupola at approximately the position where the scrap vehicles are introduced into said cupola. Accordingly, the scrap vehicles are first exposed to a substantial amount of heat as they are conveyed above the furnace and furthermore, the extremely high temperature gas which is exhausted from the furnace also contacts the vehicle as it is discharged into the cupola for purposes of being melted down to the basic metal. Because the heated gas exhausted from the furnace communicates with the cupola, said gas functions as one of the main heat sources for the cupola. However, since additional heat may frequently be needed to complete the melting down process, carbon electrodes 14 capable of producing, for example, 3,200 KBA current are disposed in the cupola and are adapted to be lowered above the molten steel to completely convert it to a liquid phase. The carbon electrode heating source is capable of increasing the temperature in the cupola to up to about 3,000° F. and even higher. The carbon electrodes are automatically adjustable in the vertical position so that a specific distance can be automatically maintained between the surface of the molten metal and the electrodes. Once the steel disposed in the cupola has been finished off, that is, completely converted to a molten stage, the carbon electrodes are automatically withdrawn from the cupola. As will be noted in FIG. 1, the bottom of the cupola 15 is sloped to facilitate the removal of the molten steel therefrom. When the steel in the cupola has been completely converted to the molten state, said steel is removed from the cupola through an aperture 16 provided in the bottom of the cupola and introduced into a holding tank 17 disposed upon a conveyor belt 18. In the holding tank, the molten steel separates into two levels, the heavier steel level 19 disposed in the bottom of the tank and the lighter slag level 20 disposed in a layer above said steel layer. The holding tank is then conveyed to any desired location and after a suitable period of time when the slag has sufficiently separated from the steel, the steel is drained from the holding tank through an aperture provided therein and further processed in, for example, a rolling mill to manufacture light structural materials, such as, for example, reinforcing bars, fence posts, and the like. The remaining slag contained in the holding tanks may be disposed of in any suitable manner as is well known in the art. As will be noted in the drawings, the holding tanks can be suitably attached to the conveying means so that after the contents contained therein has been discharged, the containers can be returned to the cupola for reuse.

As will be noted, since the exhaust from the furnace communicates with the cupola, the heat produced in said furnace as well as the heat produced by the carbon electrodes combine to produce the molten slurry in the cupola. The heated gas from the furnace and the cupola is continuously removed from the system through a substantially horizontal flue 21 which contains a plurality of devices for making effective use of the amount of heat contained in the exhaust gas. For example, the flue 21 is provided with a number of smelters 22, 23 and 24 where various component parts of the vehicle which were previously separated from the vehicle shell can be melted down and made into suitable products. Of course, the products which require the greatest amount of heat to melt them down are introduced into the smelter closest to the cupola. For example, in copper smelter 22, alternators, radiators, generators, starters, voltage regulators, and the like are introduced thereto. Another smelter (not shown) can be utilized to process the motor block of the vehicle. Thus, after the motor has been disassembled to remove the steel portions, the cast iron portions of the motor are introduced into a smelter where it is melted down for resale to foundries. A zinc smelter 23 can be utilized for handling transmissions, carburetors, and the like, and a glass smelter 24 can be utilized to melt down all of the glass contained in the vehicle. The horizontal flue stack 21 can be provided with other smelters as well as a number of other heat recovery elements such as, for example, elements 25, 26 and 27 which can be used to produce steam for running generators, etc. Following the metal processing units and heat recovering units disposed in the horizontal flue, the hot gas traveling through the flue must be further cooled down and cleaned up before it is exhausted to the atmosphere. Accordingly, the flue 21 is provided with an enlarged section 28 which is sufficiently large to provide a gap 29 between the inside diameter of said enlarged section and the outside diameter of the flue. Thus, cool ambient air is drawn into the system through this air gap 29. The enlarged section is also provided with a plurality of air vents 30 which are angled in the direction of the flow of the exhaust gas so that the air introduced therethrough thoroughly mixes with the hotter gas flowing therein thereby producing a uniformly cooler exhaust gas. Downstream of the air vents, the enlarged section of the horizontal stack is further provided with a plurality of spray nozzles 31 which are provided for removing any existing contamination in the exhaust gas. Through the use of the vacuum produced by the pump 32 disposed in the end of the horizontal flue, the gas is finally discharged to the atmosphere at a substantially reduced temperature and substantially free from contamination In reviewing the overall system as described above, it is clear that the vehicle recycling plant of the present invention makes maximum use of the heat produced in the recycling plant for providing a number of different functions and through the effective use of said heat also substantially converts all of the vehicle components into reusable products, including, for example, the use of tires as an inexpensive source of fuel. Tires are particularly desirable because their sulfur content produces a very high temperature in the furnace.

The invention being thus described, it will be obvious that the same may be varied in many ways. Such variations are not to be regarded as a departure from the spirit and scope of the invention, and all such modifications are intended to be included within the scope of the following claims.

I claim:

1. A method for recovering distinct products from scrap vehicles, said vehicles comprising steel vehicle bodies, nonferrous and cast iron vehicle parts, combustible materials including tires and noncombustible materials including glass, which comprises stripping and separating said parts, tires and glass from said scrap bodies to obtain a stripped steel vehicle body, conveying said stripped vehicle bodies adjacent a furnace, burning a fuel in said furnace to produce a heated furnace gas as well as radiant heat which preliminarily heats said stripped body, further heating the preheated bodies in a cupola by means of said heated furnace gas to produce a steel melt and a slag, which are recovered therefrom, as well as a cupola exhaust gas, said exhaust gas from said furnace and said cupola combining to form a heated flue gas, drawing said heated flue gas through a substantially horizontal flue and in heat exchange relationship with a plurality of smelters and heat recovery units for recovering and using the heat from said heated flue gas, introducing ambient air into the flue gas downstream of said heat recovery units to further reduce the temperature of said flue gas, subsequently scrubbing the flue gas with water to substantially remove any particulate matter disposed in the flue gas and exhausting the cooled and cleaned flue gas to the atmosphere.

2. The method of claim 1, wherein the temperature of the furnace is at least about 2400° F.

3. The method of claim 1, wherein said exhaust gases are combined at a location where the preheated vehicle bodies are introduced into the cupola.

4. The method of claim 3, wherein the cupola is additionally electrically heated by means of carbon electrodes.

5. The method of claim 1, wherein said vehicle parts are smelted in said smelters according to composition.

6. The method of claim 1, wherein a vacuum is provided at the discharge end of the flue for drawing the flue gas through the flue to be exhausted to the atmosphere.

7. The method of claim 1, wherein the vehicle parts comprise alternators, radiators, generators, starters, voltage regulators, transmissions and carburetors.

8. The method of claim 1, wherein the fuel which is burned in said furnace is tires.

9. The method of claim 8, wherein said tires include steel belted tires which yield recoverable ash and steel when burned, and recovering steel and ash from the furnace by vibrating the bottom portion of the furnace.

10. The method of claim 1, wherein the stripped vehicle bodies are conveyed through an enclosure adjacent said furnace, and the radiant heat produced in the furnace is utilized to heat said enclosure which, in turn, preliminarily heats said stripped vehicle bodies.

* * * * *